(12) United States Patent  
Ishii

(10) Patent No.: US 8,730,343 B2  
(45) Date of Patent: May 20, 2014

(54) COLOR PROCESSING APPARATUS AND METHOD FOR PERFORMING COLOR CONVERSION USING A COLOR APPEARANCE MODEL

(75) Inventor: Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 12/359,870

(22) Filed: Jan. 26, 2009

(65) Prior Publication Data

US 2009/0201391 A1     Aug. 13, 2009

(30) Foreign Application Priority Data

Feb. 8, 2008   (JP) ................. 2008-029585

(51) Int. Cl.
*H04N 9/73*     (2006.01)
*G06K 9/34*     (2006.01)

(52) U.S. Cl.
USPC ........................................ 348/223.1; 382/171

(58) Field of Classification Search
None
See application file for complete search history.

(56) References Cited

U.S. PATENT DOCUMENTS

| 7,072,507 | B2 | 7/2006 | Ohga | |
|---|---|---|---|---|
| 2004/0239774 | A1* | 12/2004 | Takeshita | 348/223.1 |
| 2005/0030305 | A1* | 2/2005 | Brown et al. | 345/207 |
| 2005/0168596 | A1* | 8/2005 | Ito et al. | 348/222.1 |
| 2005/0169519 | A1 | 8/2005 | Minakuti et al. | |
| 2007/0081721 | A1* | 4/2007 | Xiao et al. | 382/167 |

FOREIGN PATENT DOCUMENTS

| JP | 2002204372 | 7/2002 |
|---|---|---|
| JP | 2005210526 | 8/2005 |
| JP | 2006-80907 | 3/2006 |

* cited by examiner

*Primary Examiner* — Albert Cutler  
(74) *Attorney, Agent, or Firm* — Fitzpatrick, Cella, Harper & Scinto

(57) ABSTRACT

There is provided a color processing apparatus that performs color reproduction in accordance with the brightness of a subject at the time of photographing. An acquisition unit acquires image data. A setting unit sets viewing environment parameters for a plurality of luminance ranges based on a luminance histogram of the image data that is acquired. A processing unit performs color conversion processing using a color appearance model, using the viewing environment parameters that are set in accordance with the luminance of pixels of the image data that is acquired.

6 Claims, 16 Drawing Sheets

PRIOR ART
FIG. 13

| PARAMETER | NAME | VALUE TO BE USED |
|---|---|---|
| XwYwZw | WHITE TRISTIMULUS VALUE | TRISTIMULUS VALUE OF WHITE UNDER ORIGINAL CONDITIONS [cd/m²] |
| La | LUMINANCE VALUE OF ADAPTING FIELD | USE 20% OF WHITE LUMINANCE PLACED IN ADAPTING FIELD [cd/m²] |
| Yb | RELATIVE LUMINANCE VALUE OF BACKGROUND | PREDICT AVERAGE BRIGHTNESS, AND USE 20% OF WHITE LUMINANCE [cd/m²] |
| c | COEFFICIENT EXPRESSING IMPACT OF SURROUNDINGS | DECIDED ACCORDING TO SURROUNDINGS CONDITION (average, dim, dark) |
| Nc | CHROMATIC INDUCTION FACTOR | |
| F | FACTOR EXPRESSING DEGREE OF ADAPTATION | |

| SURROUNDINGS CONDITION | c | Nc | F |
|---|---|---|---|
| average | 0.69 | 1.0 | 1.0 |
| dim | 0.59 | 0.9 | 0.9 |
| dark | 0.525 | 0.8 | 0.8 | average : AVERAGE SURROUNDINGS (RELATIVE LUMINANCE OF SURROUNDINGS IS 20% OR MORE OF WHITE IN TARGET SCENE)
dim : DIM SURROUNDINGS (RELATIVE LUMINANCE OF SURROUNDINGS IS 20% OR LESS OF WHITE IN TARGET SCENE)
dark : DARK SURROUNDINGS (RELATIVE LUMINANCE OF SURROUNDINGS IS APPROXIMATELY 0% OF WHITE IN TARGET SCENE)

FIG. 14

| 729 (NUMBER OF MEASUREMENT COLORS) ||| ||||
|---|---|---|---|---|---|
| R | G | B | Xi | Yi | Zi |
| 0 | 0 | 0 | 0.52 | 0.55 | 0.59 |
| 0 | 0 | 32 | 0.88 | 0.95 | 0.98 |
| 0 | 0 | 64 | 5.59 | 6.12 | 7.12 |
| 0 | 0 | 96 | 8.88 | 9.25 | 11.2 |
| 0 | 0 | 128 | 9.61 | 10.5 | 12.3 |
| ⋮ | ⋮ | ⋮ | ⋮ | ⋮ | ⋮ |
| 255 | 255 | 224 | 77.8 | 84.5 | 76.7 |
| 255 | 255 | 255 | 82.1 | 86.3 | 99.7 |

FIG. 15

| VIEWING ENVIRONMENT PARAMETERS UNDER REFERENCE ENVIRONMENT $(X_w, Y_w, Z_w)=(×, ×, ×)$ $(L_a, Y_b)=(×, ×)$ $(c, N_c, F)=(×, ×, ×)$ ||||||
|---|---|---|---|---|---|
| 729 (NUMBER OF MEASUREMENT COLORS) ||||||
| R | G | B | R' | G' | B' |
| 0 | 0 | 0 | 0 | 0 | 0 |
| 0 | 0 | 32 | 4 | 0 | 55 |
| 0 | 0 | 64 | 7 | 4 | 76 |
| 0 | 0 | 96 | 28 | 20 | 120 |
| 0 | 0 | 128 | 44 | 52 | 155 |
| ⋮ | ⋮ | ⋮ | ⋮ | ⋮ | ⋮ |
| 255 | 255 | 224 | 230 | 240 | 218 |
| 255 | 255 | 255 | 255 | 250 | 245 |

COLOR PROCESSING APPARATUS AND METHOD FOR PERFORMING COLOR CONVERSION USING A COLOR APPEARANCE MODEL

BACKGROUND OF THE INVENTION

1. Field of the Invention

The present invention relates to a color processing apparatus and method that perform color reproduction that corresponds with the brightness of the subject at the time of photographing.

2. Description of the Related Art

Generally, since preferable color reproduction differs depending on the photographing scene (brightness of subject at time of photographing), it is necessary to adjust the color reproduction in accordance with the photographing scene. As technology for reproducing colors in accordance with the photographing scene, technology exists that reproduces colors so as to impressively match the appearance at the time a photographer photographs a subject on a print or a monitor on the viewing environment side. This technology uses a color appearance model (CAM) such as CIECAM97s or CIECAM02 that are recommended by CIE (for example, see Japanese Patent Laid-Open No. 2006-080907).

The aforementioned color appearance model will now be briefly described. CIECAM02 that is one example of a color appearance model uses mathematical expressions to model the degree of adaptation with respect to an illuminating light or to model visual phenomena such as a contrast effect produced by the background. More specifically, based on tristimulus values XYZ of a given color, CIECAM02 transforms the color into a perceptual color space that is expressed by attributes (perceptual brightness J value, perceptual saturation C value, perceptual hue h value) that represent the appearance of a given color as the human perception by taking into consideration the viewing conditions of the visual environment. Utilizing this color appearance model, viewing environment parameters are set for the input side and the reproduction destination side, respectively, and by performing transformation from the input side and inverse transformation to the reproduction destination side so that values on the perceptual color space match, it is possible to obtain colors having the same appearance even though the tristimulus values thereof differ.

In recent years, a color appearance model adapted for still images (iCAM) has been proposed by the CIE. In iCAM, local chromatic adaptation processing and visual frequency characteristics are taken into account to expand the color processing of CAM. As the local chromatic adaptation processing of iCAM, the field of view of the viewer is defined, viewing environment parameters are calculated based on the pixel data distributed in the field of view, and viewing environment parameters are set for each pixel in the image to perform color transformation.

As an example of viewing environment parameters of a color appearance model, FIG. 13 shows viewing environment parameters for CIECAM02 as well as the recommended value for each parameter.

However, the following problem exists with the above-described conventional color reproduction technology that uses a color appearance model. That is, with the viewing environment parameters recommended by CIECAM02, because all pixels of an image undergo color transformation using the same viewing environment parameters, there are cases in which the appearance cannot necessarily be appropriately reproduced. For example, as the luminance of the adapting field that is one viewing environment parameter, gray corresponding to a luminance value of 20% of white luminance is set that is assumed to represent the average brightness of a subject. Accordingly, optimal color transformation is not executed on pixels in regions in which the brightness is higher or lower than the gray in question in a subject image.

Further, when using iCAM as a color appearance model, since color transformation is performed by setting viewing environment parameters for each pixel, there is the problem that although the appearance of the defined field of view is favorably reproduced, in some cases the color balance when the entire image is viewed is not favorably reproduced. Particularly, in a case in which the defined field of view is narrow, since the adapting white point approaches the chromaticity point of the pixel value of interest, the saturation of the overall image decreases.

SUMMARY OF THE INVENTION

The present invention has been made to solve the above described problems individually or collectively. An object of the invention is to provide a color processing apparatus and a method that enable preferable color reproduction that is in accordance with the scene of a subject at the time of photographing to be performed for each pixel.

According to one aspect of the present invention, a color processing apparatus includes an acquisition unit configured to acquire image data, a setting unit configured to set viewing environment parameters for each of a plurality of luminance ranges based on a luminance histogram of the image data that is acquired, and a processing unit configured to perform color conversion processing using a color appearance model, by using the viewing environment parameters that are set in accordance with a luminance of a pixel of the image data that is acquired.

Further features of the present invention will become apparent from the following description of exemplary embodiments with reference to the attached drawings.

BRIEF DESCRIPTION OF THE DRAWINGS

FIG. 13 is a view showing viewing environment parameters and recommended values thereof according to CIECAM02;

FIG. 14 is a view showing an example of the format of a device profile according to an embodiment of the present invention;

FIG. 15 is a view showing an example of the file format of a color conversion table according to the second embodiment of the present invention.

DESCRIPTION OF THE EMBODIMENTS

Figure 1:
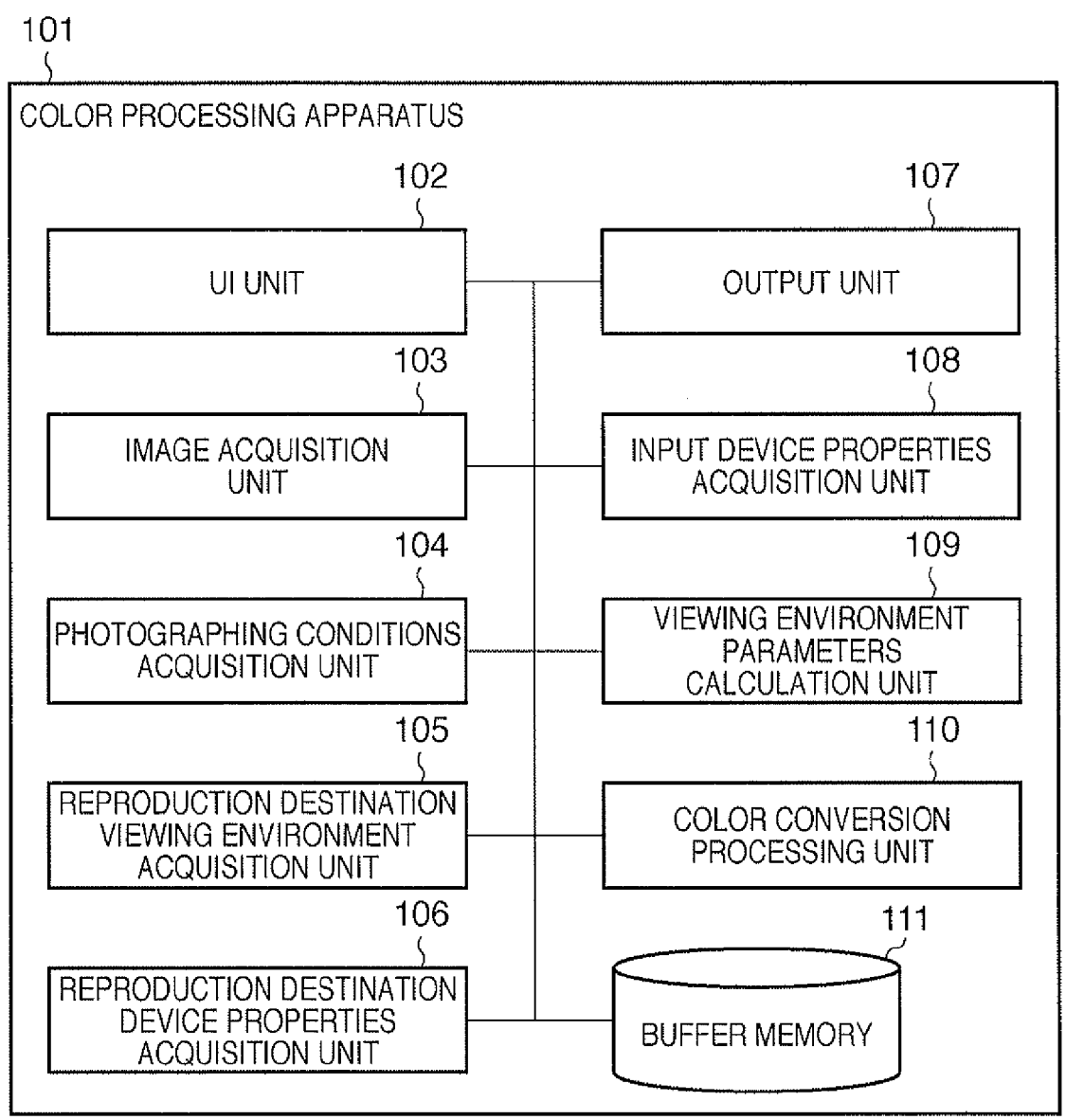
FIG. 1 is a block diagram showing the configuration of a color processing apparatus according to an embodiment of the present invention.

Various exemplary embodiments, features, and aspects of the present invention will be described in detail below with reference to the drawings.

First Embodiment

Conversion Formula of Color Appearance Model CIECAM02

First, to facilitate understanding of the present embodiment prior to describing the embodiment in detail, conversion formulas and viewing environment parameters of the color appearance model (CIECAM02) used in the color processing process of the present embodiment are described.

The overall processing flow of CIECAM02 forward conversion is described hereunder by dividing the overall processing flow into three conversion blocks, that is, a chromatic adaptation block, a cone response block, and a psychophysical value conversion block.

The chromatic adaptation block converts XYZ values into spectral sensitivities of cones using the following formula (a), and the signal of each cone is normalized with the value of a white point of a light source using formula (c). An adaptation coefficient D in formula (c) is calculated by formula (d).

Conversion to XYZ values corresponding to a light source in the viewing environment is then performed using formula (b).

$$\begin{bmatrix} R \\ G \\ B \end{bmatrix} = M_{cat02} \begin{bmatrix} X \\ Y \\ Z \end{bmatrix}, M_{cat02} = \begin{bmatrix} 0.7328 & 0.4296 & -0.1624 \\ -0.7036 & 1.6975 & 0.0061 \\ 0.0030 & 0.0136 & 0.9834 \end{bmatrix} \quad (a)$$

$$M_{cat02}^{-1} = \begin{bmatrix} 1.096124 & -0.278869 & 0.182745 \\ 0.454369 & 0.473533 & 0.072098 \\ -0.009628 & -0.005698 & 1.015326 \end{bmatrix} \quad (b)$$

$$\begin{aligned} Rc &= [(YwD/Rw) + (1-D)]R \\ Gc &= [(YwD/Gw) + (1-D)]G \\ Bc &= [(YwD/Bw) + (1-D)]B \end{aligned} \quad (c)$$

$$D = F\left[1 - \left(\frac{1}{3.6}\right)e^{\left(\frac{-(La+42)}{92}\right)}\right] \quad (d)$$

The cone response block converts XYZ values obtained as described above to spectral sensitivity values of cones using formula (e) These converted values are further converted into cone response values after adaptation accordance to the amount of light intensity that enters the eye using, formula (f).

$$\begin{bmatrix} R' \\ G' \\ B' \end{bmatrix} = M_{HPE} \begin{bmatrix} X' \\ Y' \\ Z' \end{bmatrix}, M_{HPE} = \begin{bmatrix} 0.38971 & 0.68898 & -0.07868 \\ -0.22981 & 1.18340 & 0.04641 \\ 0.00000 & 0.00000 & 1.00000 \end{bmatrix} \quad (e)$$

$$Ra' = \frac{400(F_L R'/100)^{0.42}}{27.13 + (F_L R'/100)^{0.42}} + 0.1 \quad (f)$$

$$Ga' = \frac{400(F_L G'/100)^{0.42}}{27.13 + (F_L G'/100)^{0.42}} + 0.1$$

$$Ba' = \frac{400(F_L B'/100)^{0.42}}{27.13 + (F_L B'/100)^{0.42}} + 0.1$$

Luminance adaptation factor $$k = 1/(5La + 1)$$
$$F_L = 0.2k^4(5La) + 0.1(1-k^4)^2(5La)^{1/3}$$
$$n = Yb/Yw$$

Background induction factor $Nbb = Ncb = 0.725(1/n)^{0.2}$

Index of nonlinear conversion $z = 1.48 + \sqrt{n}$

Next, the psychophysical value conversion block first converts the cone response values obtained as described above into signal values of an achromatic color response and opponent color responses of the visual area, using formulas (g), (h), and (i). Thereafter, using formulas (j), (k), and (l), the block converts these signal values into a perceptual brightness J value, perceptual saturation C value, and perceptual hue h value.

Achromatic Color Response $$A = [2Ra' + Ga' + (1/20)Ba' - 0.305]Nbb \quad (g)$$

Red-Green Opponent Color Response $$a = Ra' - 12Ga'/11 + Ba'/11 \quad (h)$$

Yellow-Blue Opponent Color Response $$b = (1/9)(Ra' + Ga - 2Ba') \quad (i)$$

Brightness $J = 100(A/Aw)^{cz}$ (j)

Hue angle $h = \tan^{-1}(b/a)$ (k)

Saturation $C = t^{0.9}\sqrt{J/100}(1.64 - 0.29^n)^{0.73}$ (l)

$$e' = \frac{1}{4}\left[\cos\left(h\frac{\pi}{180} + 2\right) + 3.8\right]$$

$$t = \frac{(50000/13)NcNcbe'(a^2 + b^2)^{1/2}}{Ra' + Ga' + (21/20)Ba'}$$

In this connection, when performing CIECAM02 inverse conversion, viewing environment parameters are set in accordance with the viewing environment, and a new achromatic color response Aw is calculated in the aforementioned forward conversion process. Thereafter, inverse processes of the forward conversion processing are executed using this Aw value and JCh values and relevant coefficients, thus converting into X, Y, and Z values.

FIG. 13 shows examples of viewing environment parameters recommended by CIECAM02. A feature of the present embodiment is that, among these viewing environment parameters, the luminance La of the adapting field and the relative luminance value Yb of the background are set for each pixel in accordance with the luminance level of the relevant pixel, and not the average value within the image. In this connection, the parameters recommended by CIECAM02 are used for the other viewing environment parameters.

Apparatus Configuration

FIG. 1 is a block diagram that shows the hardware configuration of a color processing apparatus 101 according to the present embodiment. In FIG. 1, reference numeral 102 denotes a UI unit that is a user interface for allowing a user to specify a conversion source image, photographing conditions information, and device information and viewing environment information of the reproduction destination. Reference numeral 103 denotes an image acquisition unit configured to acquire an RGB image as a conversion source image. Reference numeral 104 denotes a photographing conditions acquisition unit configured to acquire the photographing conditions when the subject was photographed from the conversion source image. Reference numeral 105 denotes a reproduction destination viewing environment acquisition unit configured to acquire the viewing environment of the reproduction destination. Reference numeral 106 denotes a reproduction destination device properties acquisition unit configured to acquire the properties of the reproduction destination device. Reference numeral 107 denotes an output unit configured to output RGB image data that has undergone color conversion processing. Reference numeral 108 denotes an input device properties acquisition unit configured to acquire the properties of the input device at the time of photographing. Reference numeral 109 denotes a viewing environment parameters calculation unit configured to calculate viewing environment parameters that are set in a color appearance model. Reference numeral 110 denotes a color conversion processing unit configured to convert RGB image data using a color appearance model. Reference numeral 111 denotes a buffer memory that temporarily stores image data and calculation results for performing arithmetic processing.

Overview of Color Processing

Figure 2:
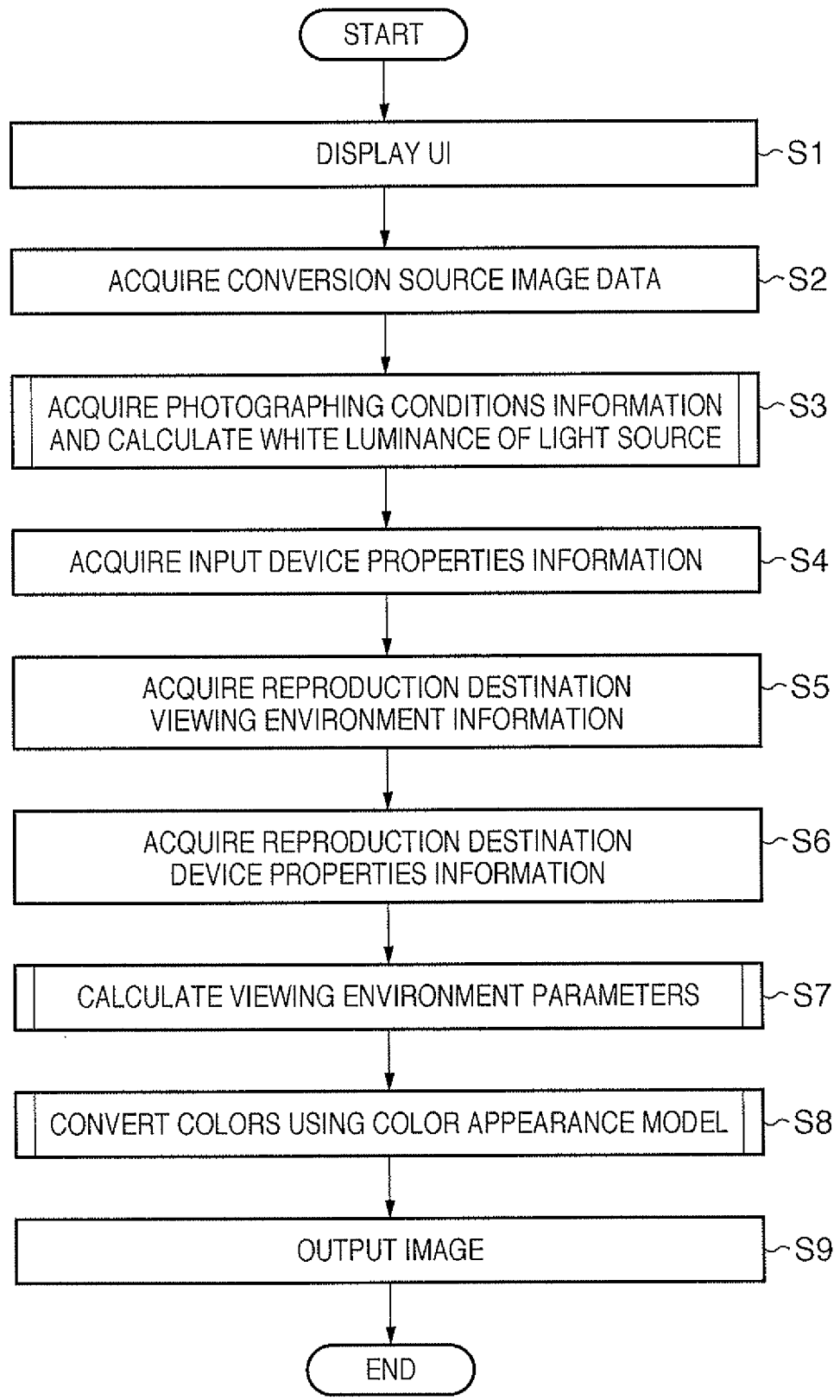
FIG. 2 is a flowchart illustrating an outline of color processing according to an embodiment of the present invention.

Hereunder, an overview of color processing in the color processing apparatus 101 of the present embodiment is described using the flowchart shown in FIG. 2.

Figure 3:
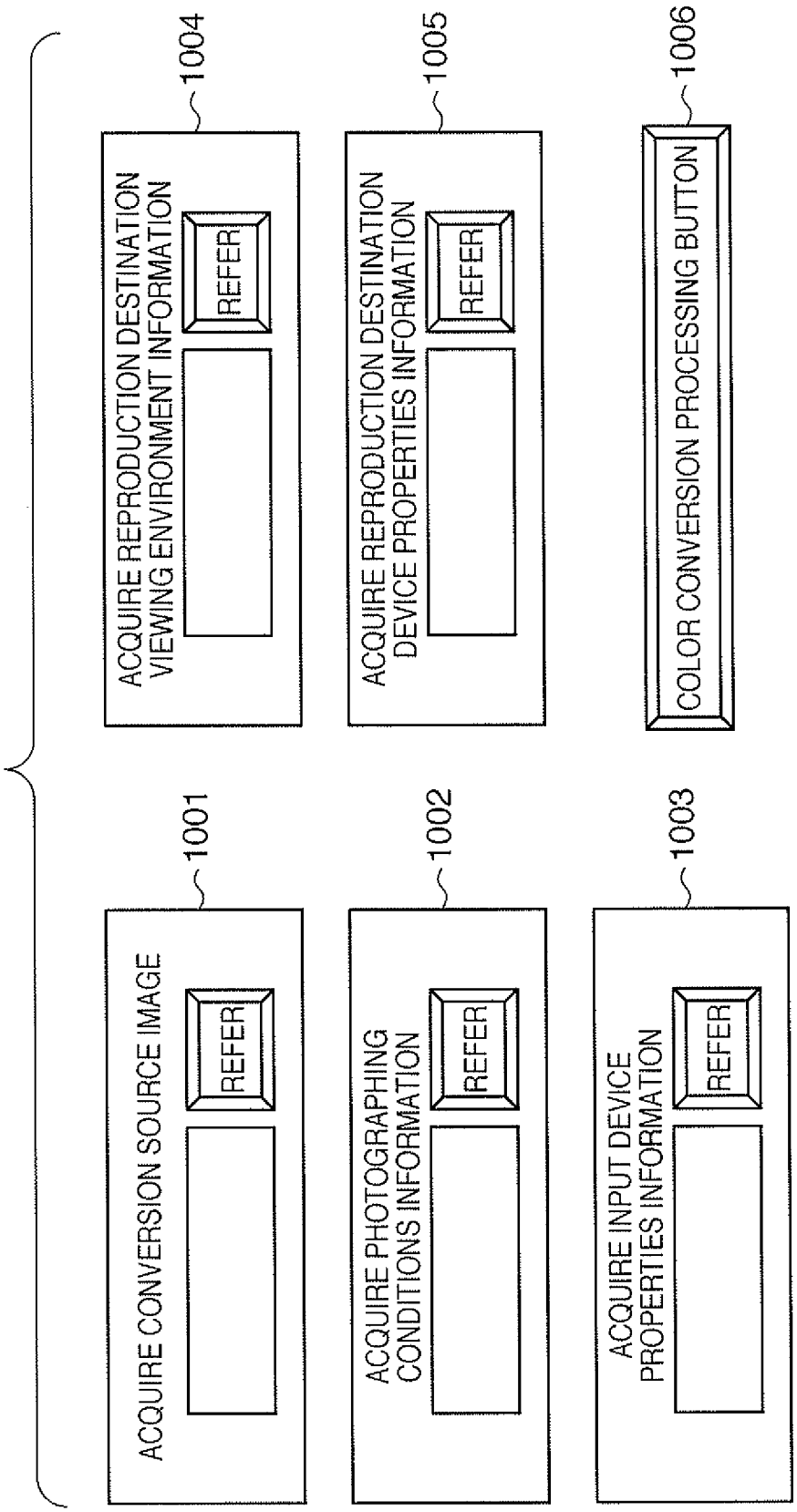
FIG. 3 is a view showing a UI example according to an embodiment of the present invention.

First, in step S1, the UI unit 102 displays a user interface (UI) to allow the user to input information necessary for color conversion. An example of the UI that is displayed by the UI unit 102 is shown in FIG. 3. The UI example shown in FIG. 3 includes a conversion source image acquisition UI portion 1001 that acquires an RGB image as a conversion source image, a photographing conditions acquisition UI portion 1002 that acquires the photographing conditions at the time the subject was photographed, and an input device properties acquisition UI portion 1003 that acquires properties of the input device. The UI example shown in FIG. 3 also includes a reproduction destination viewing environment information acquisition UI portion 1004 that acquires viewing environment information of the reproduction destination, a reproduction destination device properties information acquisition UI portion 1005 that acquires information regarding the properties of the reproduction destination device, and a color conversion processing button 1006.

After various information has been input to the UI unit 102 in step S1 as described above, in the subsequent step S2, the image acquisition unit 103 refers to the image file name that is input at the conversion source image acquisition UI portion 1001 from the buffer memory 111 to acquire the conversion source image data. The conversion source image data is, more specifically, the color conversion object of the present embodiment.

Next, in step S3, from the file that is input at the photographing conditions acquisition UI portion 1002, the photographing conditions acquisition unit 104 acquires information regarding the photographing conditions when the subject was photographed, and calculates the white luminance of the light source at the time of photographing and stores the result in the buffer memory 111. In this connection, camera settings such as the ISO sensitivity, lens aperture value, exposure time, and color space when the conversion source image data was photographed are described in a file that is set by the photographing conditions acquisition UI portion 1002. Although this file may be an independent file, according to the present embodiment it is assumed that Exif data that is additional information of the conversion source image data that is set from the conversion source image acquisition UI portion 1001 is utilized, and in this case the photographing conditions acquisition UI portion 1002 need not perform setting. The specific processing of the photographing conditions acquisition unit 104 will be described later.

Next, in step S4, the input device properties acquisition unit 108 acquires an input profile showing the properties of the input device from the file input at the input device properties acquisition UI portion 1003, and stores the input profile in the buffer memory 111. In this case, the input profile is a file in which conversion characteristics for converting from device-dependent colors (RGB) to device-independent colors (XYZ) are described. The conversion characteristics are, for example, described as a γ+ matrix to convert to XYZ from RGB or as a conversion look-up table (LUT). When the conversion characteristics for converting from RGB to XYZ are unknown, color space information (sRGB, Adobe RGB or the like) is described in the input profile from the additional information of the input image data, and conversion to XYZ from RGB is performed based on the color space conversion formula that is described.

Next, in step S5, the reproduction destination viewing environment acquisition unit 105 acquires reproduction destination viewing environment information from the file input at the reproduction destination viewing environment information acquisition UI portion 1004, and stores the acquired reproduction destination viewing environment information in the buffer memory 111. In this connection, the file input at the reproduction destination viewing environment information acquisition UI portion 1004 describes viewing environment parameters, such as those exemplified in FIG. 13, in the reproduction destination viewing environment.

Subsequently, in step S6, the reproduction destination device properties acquisition unit 106 acquires properties of the reproduction destination device from the file input at the reproduction destination device properties information acquisition UI portion 1005, and stores the acquired properties in the buffer memory 111. In this connection, the file input at the reproduction destination device properties information acquisition UI portion 1005 is a file in which are described conversion characteristics for converting from device-dependent colors (RGB) to device-independent colors (XYZ), and according to the present embodiment, for example, an LUT-format file as shown in FIG. 14 is used. Although according to the LUT shown in FIG. 14, a format is shown in which nine steps are described as the number of gradations, the number of gradations and number of measurement colors are not limited thereto.

Next, in step S7, the viewing environment parameters calculation unit 109 calculates the viewing environment parameters at the time of photographing using the RGB image data acquired in step S2 and the photographing conditions acquired in step S3. The specific processing of the viewing environment parameters calculation unit 109 is described later.

In step S8, the color conversion processing unit 110 sets the viewing environment parameters calculated in step S6 in a color appearance model, and converts the RGB image data acquired in step S2 in accordance with the color appearance model. The specific processing of the color conversion processing unit 110 is described later.

Finally, in step S9, the output unit 107 outputs RGB image data converted in step S8 to end the processing.

Photographing Conditions Acquisition Processing (S3)

Figure 4:
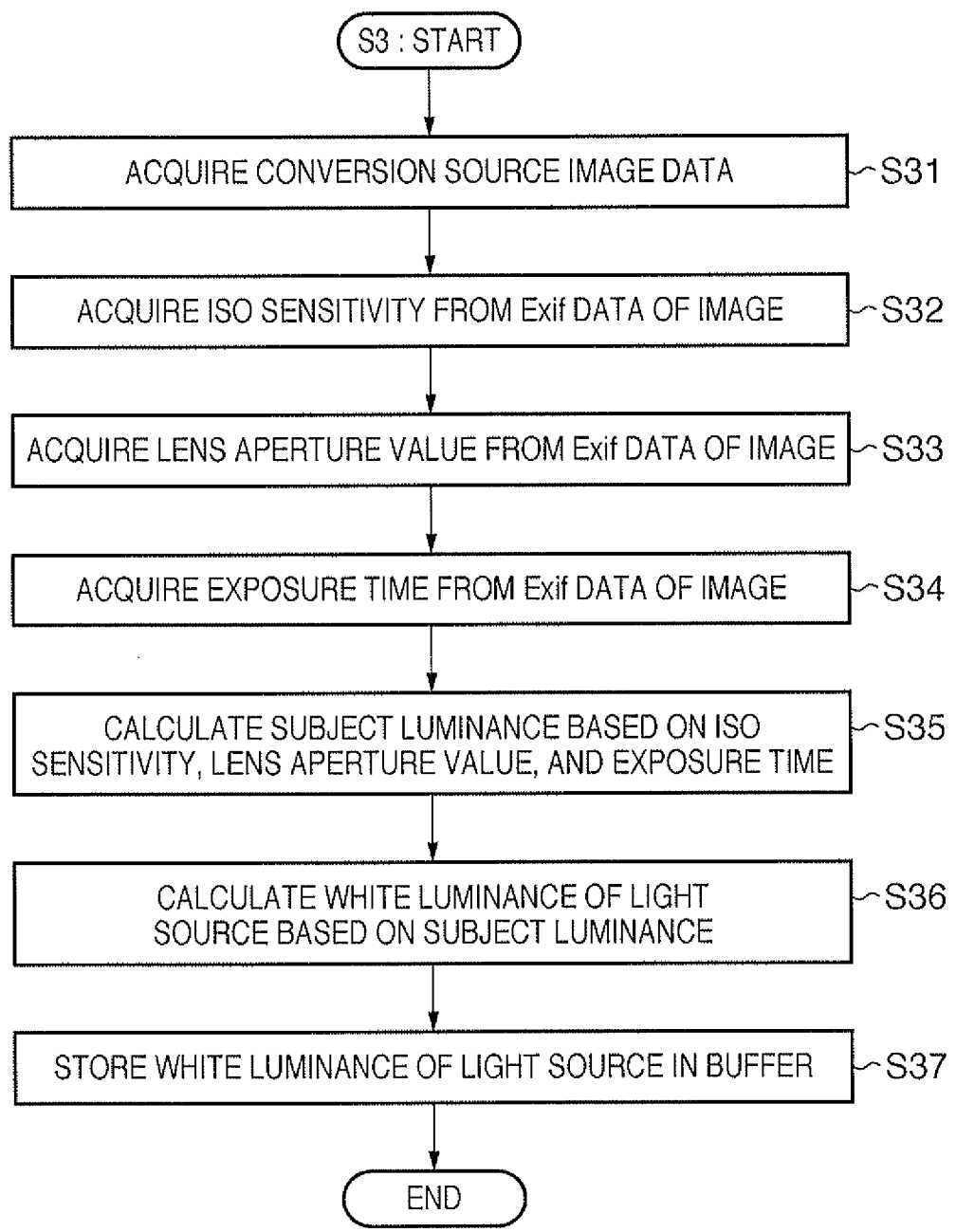
FIG. 4 is a flowchart illustrating photographing conditions acquisition processing according to an embodiment of the present invention.

Specific operations of the photographing conditions acquisition unit 104 in the aforementioned step S3 will now be described using the flowchart shown in FIG. 4.

First, in step S31, the photographing conditions acquisition unit 104 acquires the conversion source image data from the buffer memory 111. Thereafter, in steps S32, S33, and S34, the ISO sensitivity, lens aperture value, and exposure time are respectively acquired from the additional information (Exif data) of the conversion source image data acquired in step S31. Subsequently, in step S35, the photographing conditions acquisition unit 104 calculates the subject luminance B based on the following equation (1) from the acquired ISO sensitivity, lens aperture value, and exposure time.

$$EV=SV+BV=AV+TV \quad (1)$$

$SV=\log_2(ISO/3.125)$
$BV=\log_2(B/N \times K)$
$AV=2\log_2(F)$
$TV=-\log_2(T)$ In equation (1), "EV" represents the exposure value, "SV" represents a value obtained by converting the ISO sensitivity into an APEX value, and "BV" represents a value obtained by converting the subject luminance B (cd/m$^2$) that indicates the luminance of a subject (18% gray) into an APEX value (K/N: constant). In this case, an APEX value is a numerical value for handling the exposure time, aperture value, and sensitivity using the same units. Further, "AV" represents a value obtained by converting a lens aperture value into an APEX value, and "TV" represents a value obtained by converting exposure time into an APEX value. Furthermore, "ISO" represents the ISO sensitivity, "F" represents the F value, and "T" represents the shutter speed.

Next, in step S36, the white luminance LY of the light source is calculated from the subject luminance B calculated in step S35 by the following equation (2).

$$LY=B\times100/18 \quad (2)$$

In step S37, the white luminance LY of the light source that is calculated in step S36 is stored in the buffer memory 111.

Viewing Environment Parameters Calculation Processing (S7)

Figure 5:
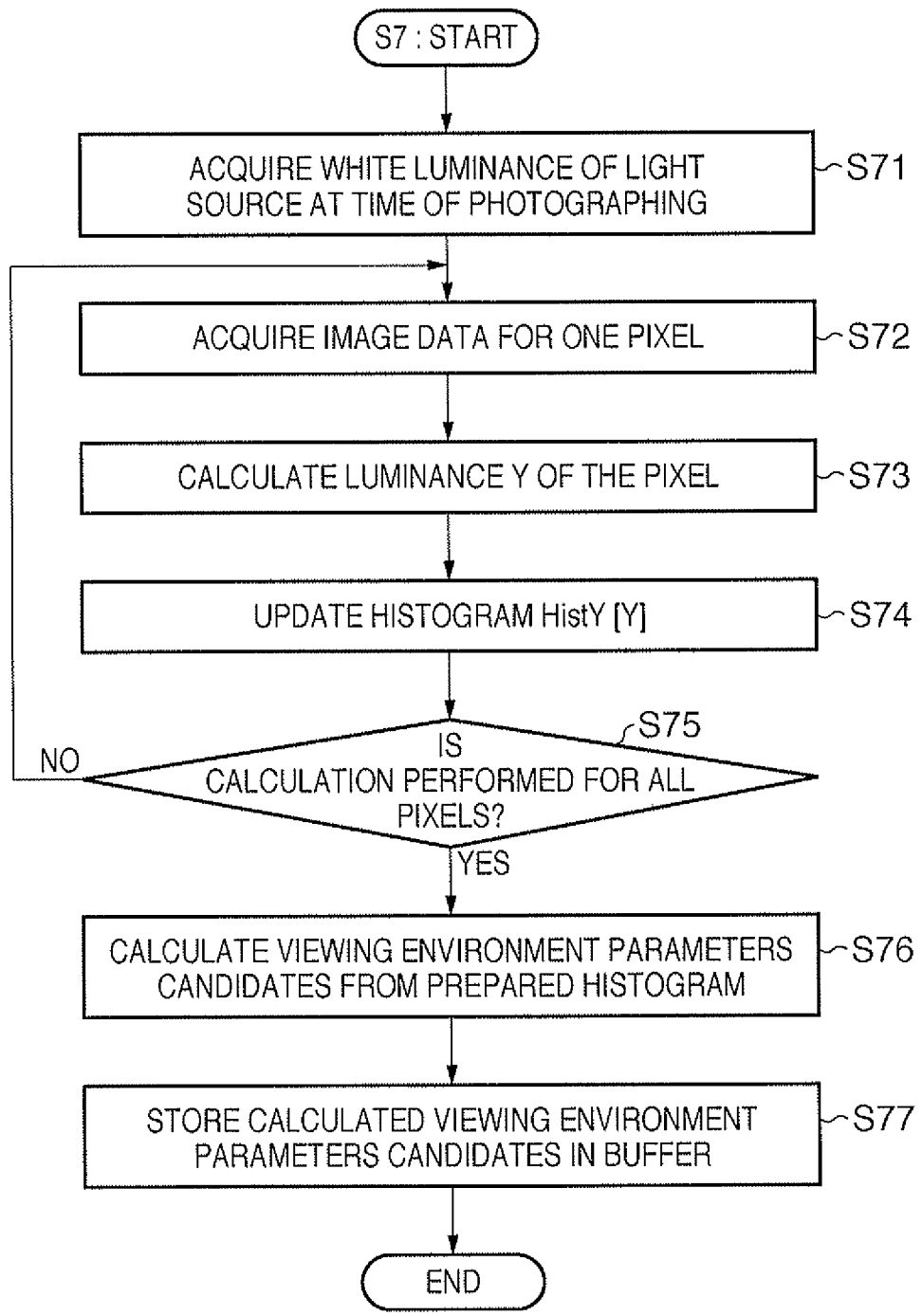
FIG. 5 is a flowchart illustrating viewing environment parameters calculation processing according to an embodiment of the present invention.

Next, the specific processing of the viewing environment parameters calculation unit 109 in the aforementioned step S7 is described using the flowchart shown in FIG. 5.

First, in step S71, the viewing environment parameters calculation unit 109 acquires the white luminance LY of the light source at the time of photographing that is calculated in step S3 from the buffer memory 111. In step S72, the viewing environment parameters calculation unit 109 acquires conversion source image data for one pixel from the buffer memory 111. In step S73, the viewing environment parameters calculation unit 109 calculates a luminance value Y for the pixel in question from the RGB value of the image data acquired in step S72. In this case, the calculation of luminance is performed in a simplified manner using the approximate expression of the following equation (3).

$$Y=LY\times(3\times R+6\times G+1\times B)/10 \quad (3)$$

Next, in step S74, the viewing environment parameters calculation unit 109 updates a histogram stored in a histogram holding unit (unshown) of the buffer memory 111. The histogram holding unit holds a histogram showing the luminance distribution of the image data, that is, a histogram HistY of the luminance value Y that is calculated using the aforementioned equation (3). The initial state of HistY is all 0, and the histogram is updated according to the following equation (4).

$$HistY[Y]=HistY[Y]+1 \quad (4)$$

Next, in step S75, the viewing environment parameters calculation unit 109 determines whether or not updating of the histogram is completed for all pixels, and if all histogram updating is completed the viewing environment parameters calculation unit 109 ends the processing. If all histogram updating is not completed, the viewing environment parameters calculation unit 109 returns to step S72 to continue the processing.

In step S76, the viewing environment parameters calculation unit 109 calculates candidates for the luminance value of the adapting field and the relative luminance value of the background as viewing environment parameters based on the histogram created in step S74. In this case, the luminance value of the adapting field and the relative luminance value of the background are calculated in accordance with the luminance level of the image. According to the present embodiment, the luminance level is divided into three regions (three luminance ranges), that is, an upper side region of 25% on the upper side of the histogram, an intermediate region of 25 to 75% on the upper side of the histogram, and a lower side region of 25% on the lower side of the histogram. The mean luminance value in each region is prepared as a candidate for the luminance value La of the adapting field and the relative luminance value Yb of the background. According to the present embodiment, when setting viewing environment parameters for each pixel in color conversion processing at a subsequent stage, for example, if the luminance of a pixel is in the upper side region of the histogram the mean luminance value of the upper side region is employed as the luminance value La of the adapting field and the relative luminance value Yb of the background. More specifically, the viewing environment parameters to be set differ according to the luminance of the pixel. In this connection, in the case of setting a white point with a relative value when setting the viewing environment parameters, it is necessary to standardize the relative luminance value Yb of the background calculated as described above with the luminance value of white.

Subsequently, in step S77, the viewing environment parameters candidates (luminance value of adapting field and relative luminance value of background) calculated in step S76 are stored in the buffer memory 111.

Color Conversion Processing (S8)

Figure 6:
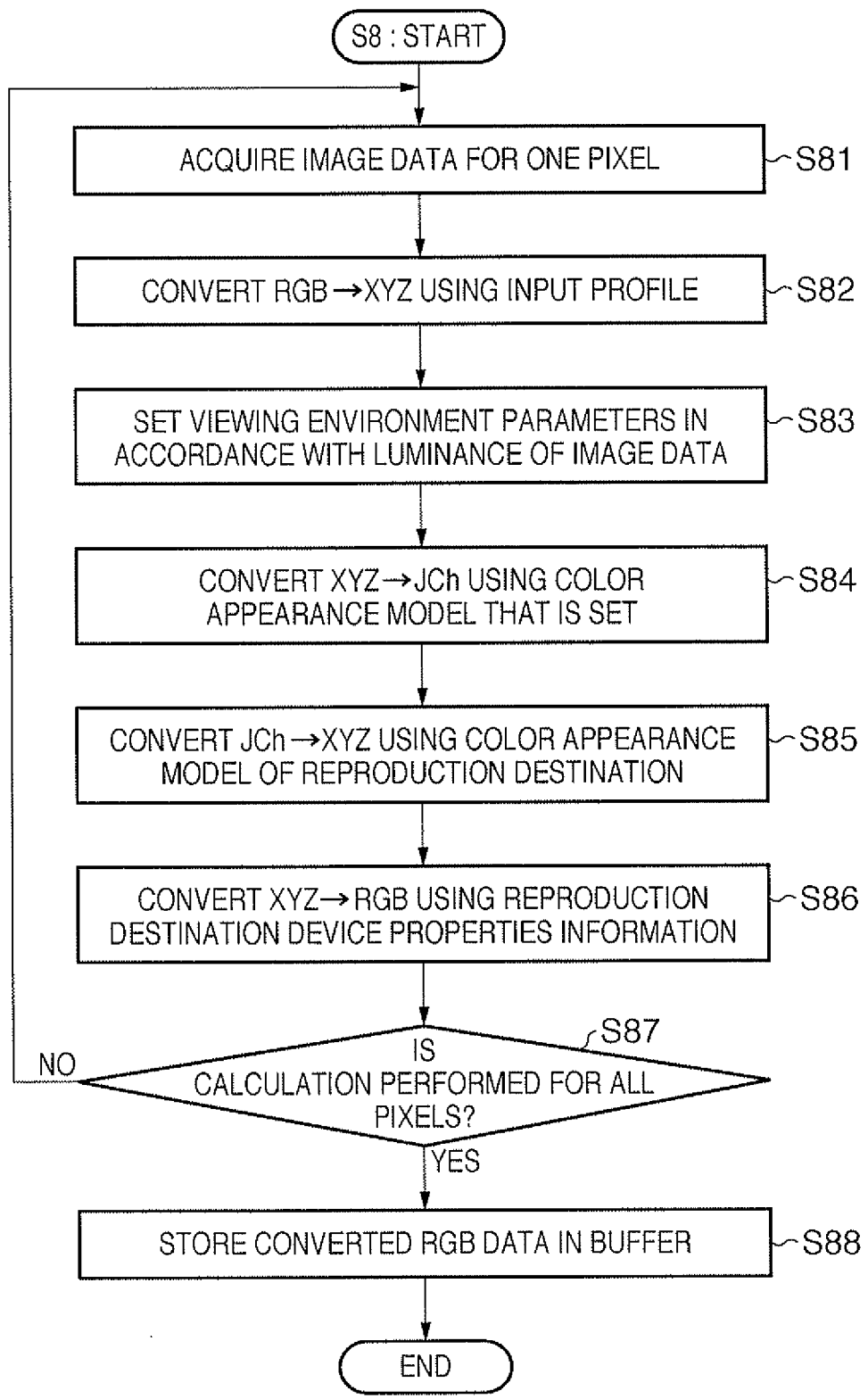
FIG. 6 is a flowchart illustrating color conversion processing according to an embodiment of the present invention.

Next, the specific operations of the color conversion processing unit 110 in the above described step S8 are described using the flowchart in FIG. 6.

First, in step S81, image data for one pixel is acquired from the buffer memory 111. In step S82, the input profile is acquired from the buffer memory 111 to convert the RGB data of the relevant pixel into XYZ values.

Next, in step S83, viewing environment parameters are set in accordance with the luminance level of the pixel. More specifically, first the viewing environment parameter candidates (luminance value of adapting field and relative luminance value of background) calculated in step S7 are acquired from the buffer memory 111, and the appropriate value according to the luminance level of the pixel is selected from among the candidates and set. That is, according to the present embodiment, for the luminance value La of the adapting field and the relative luminance value Yb of the background among the viewing environment parameters of the color appearance model (CIECAM02 according to the present embodiment), a parameter is set according to the pixel luminance levels that are calculated in step S7. For other white points (white tristimulus values) or ambient conditions (viewing parameters), the recommended parameters of CIECAM02 are set. Accordingly, particularly with respect to the adapting white point parameter, the same value is used for all pixels of the conversion source image data. More specifically, it is sufficient to use the white luminance of the light source at the time of photographing.

Next, in step S84, the XYZ values calculated in step S82 are converted to JCh values based on the color appearance model in which the viewing environment parameters have been set in step S83. Further, in step S85, the JCh values are converted to XYZ values based on a color appearance model in accordance with the reproduction destination viewing environment parameters acquired in step S5. Furthermore, in step S86, the XYZ values are converted to RGB values using the reproduction destination device properties information acquired in step S6.

Subsequently, in step S87, the color conversion processing unit 110 determines whether or not color conversion using the color appearance model has been completed for all pixels. If color conversion is completed for all pixels, the color conversion processing unit 110 advances to step S88, and thereafter ends the processing. If color conversion is not completed for all pixels, the color conversion processing unit 110 returns to step S81 to continue the processing.

Finally, in step S88, the RGB data obtained by the conversion processing between step S81 and step S87 is stored in the buffer memory 111.

Figure 16:
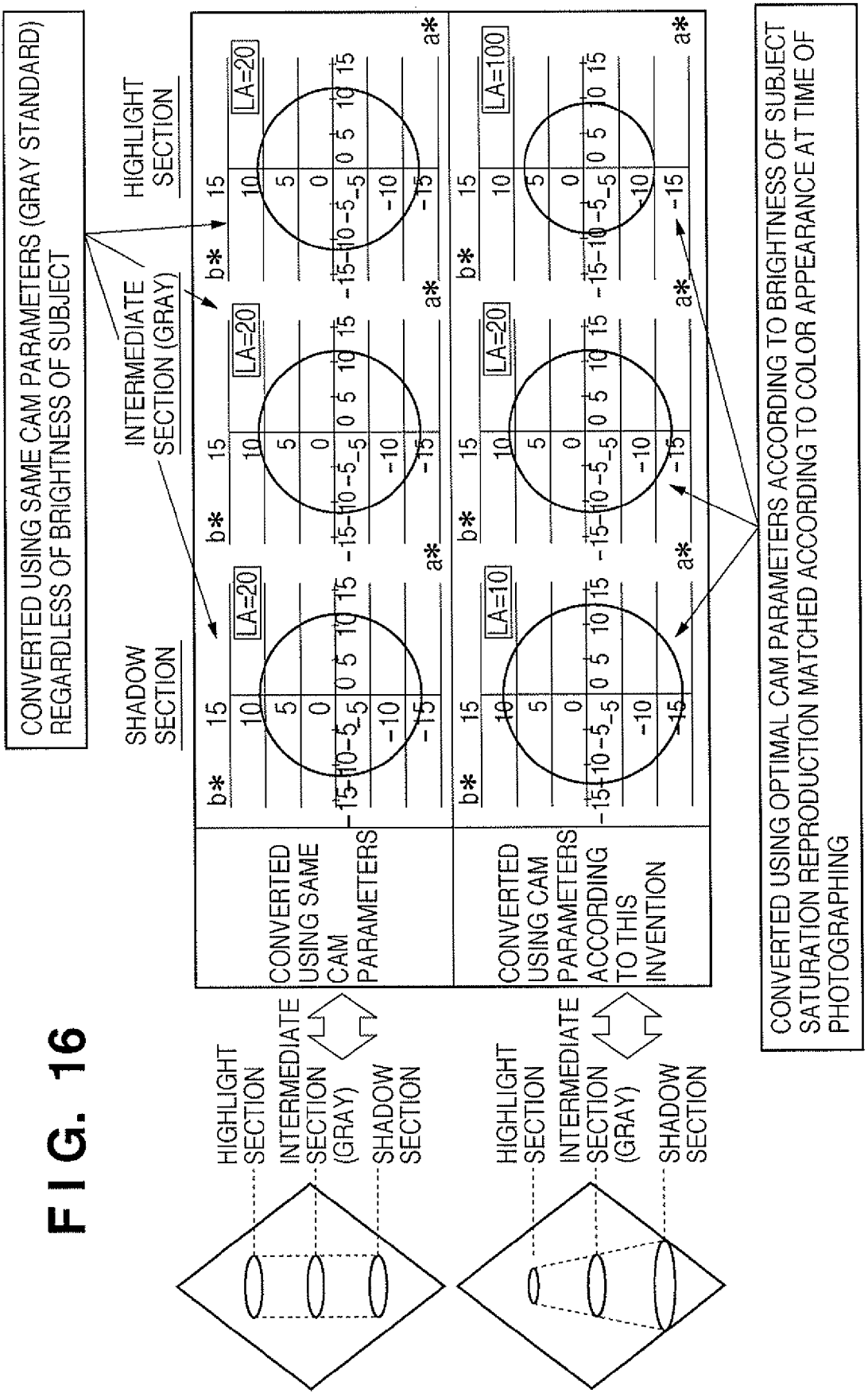
FIG. 16 is a view showing a color reproduction example according to an embodiment of the present invention.

The advantages of the present embodiment are exemplified in FIG. 16. FIG. 16 shows a comparison between a case in which predetermined color data is converted with the same CAM parameters as in the conventional technique and a case in which predetermined color data is converted with CAM parameters that are set in accordance with the brightness of a subject according to the present embodiment. From FIG. 16 it is found that although saturation reproduction is the same irrespective of the scene when color data is converted using the same CAM parameters, when conversion is performed using CAM parameters in accordance with the brightness of the subject, the saturation reproduction changes appropriately in accordance with the scene. Thus, by performing conversion with CAM parameters that are in accordance with the brightness of a subject it is possible to obtain more favorable image reproduction compared to the case in which conversion is performed using the same CAM parameters.

According to the present embodiment as described above, color conversion is performed by setting values that are in accordance with the pixel brightness for each pixel of a photographed image as a luminance value of the adapting field and a relative luminance value of the background as viewing environment parameters of a color appearance model. It is thus possible to obtain preferable color reproduction that is in accordance with the scene of the subject at the time of photographing.

Second Embodiment

A second embodiment relating to the present invention is described hereunder.

In the first embodiment described above an example was described in which color conversion is performed by directly setting viewing environment parameters of a color appearance model in accordance with luminance for each pixel of a photographed image. A feature of the second embodiment is that a color conversion table is corrected in accordance with the saturation for each pixel of a photographed image.

Apparatus Configuration

Figure 7:
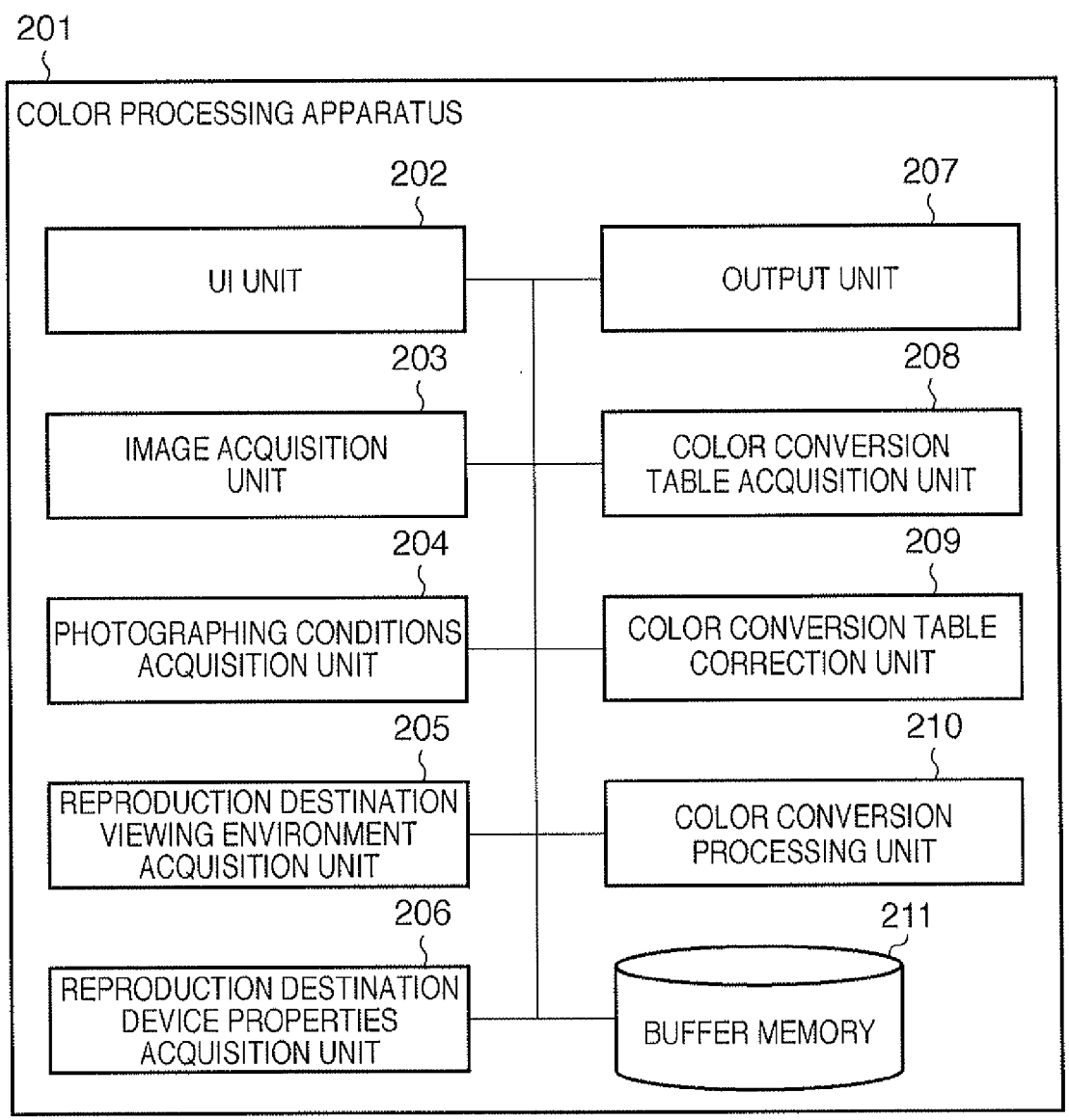
FIG. 7 is a block diagram showing the configuration of a color processing apparatus according to the second embodiment of the present invention.

FIG. 7 is a block diagram that shows the hardware configuration of a color processing apparatus 201 according to the second embodiment. In FIG. 7, reference numeral 202 denotes a UI unit that is a user interface for allowing a user to specify a conversion source image, photographing condition information, device information and viewing environment information of the reproduction destination, and a color conversion table. Reference numeral 203 denotes an image acquisition unit configured to acquire an RGB image as a conversion source image. Reference numeral 204 denotes a photographing conditions acquisition unit configured to acquire photographing conditions at the time the subject is photographed. Reference numeral 205 denotes a reproduction destination viewing environment acquisition unit configured to acquire the viewing environment of the reproduction destination. Reference numeral 206 denotes a reproduction destination device properties acquisition unit configured to acquire the properties of the reproduction destination device. Reference numeral 207 denotes an output unit configured to output RGB image data that has undergone color conversion processing. Reference numeral 208 denotes a color conversion table acquisition unit configured to acquire a color conversion table for converting an image. Reference numeral 209 denotes a color conversion table correction unit configured to correct the acquired color conversion table in accordance with the photographing conditions. Reference numeral 210 denotes a color conversion processing unit configured to convert RGB image data using the color conversion table that is corrected by the color conversion table correction unit 209. Reference numeral 211 denotes a buffer memory that temporarily stores image data and calculation results for performing arithmetic processing.

Overview of Color Processing

Figure 8:
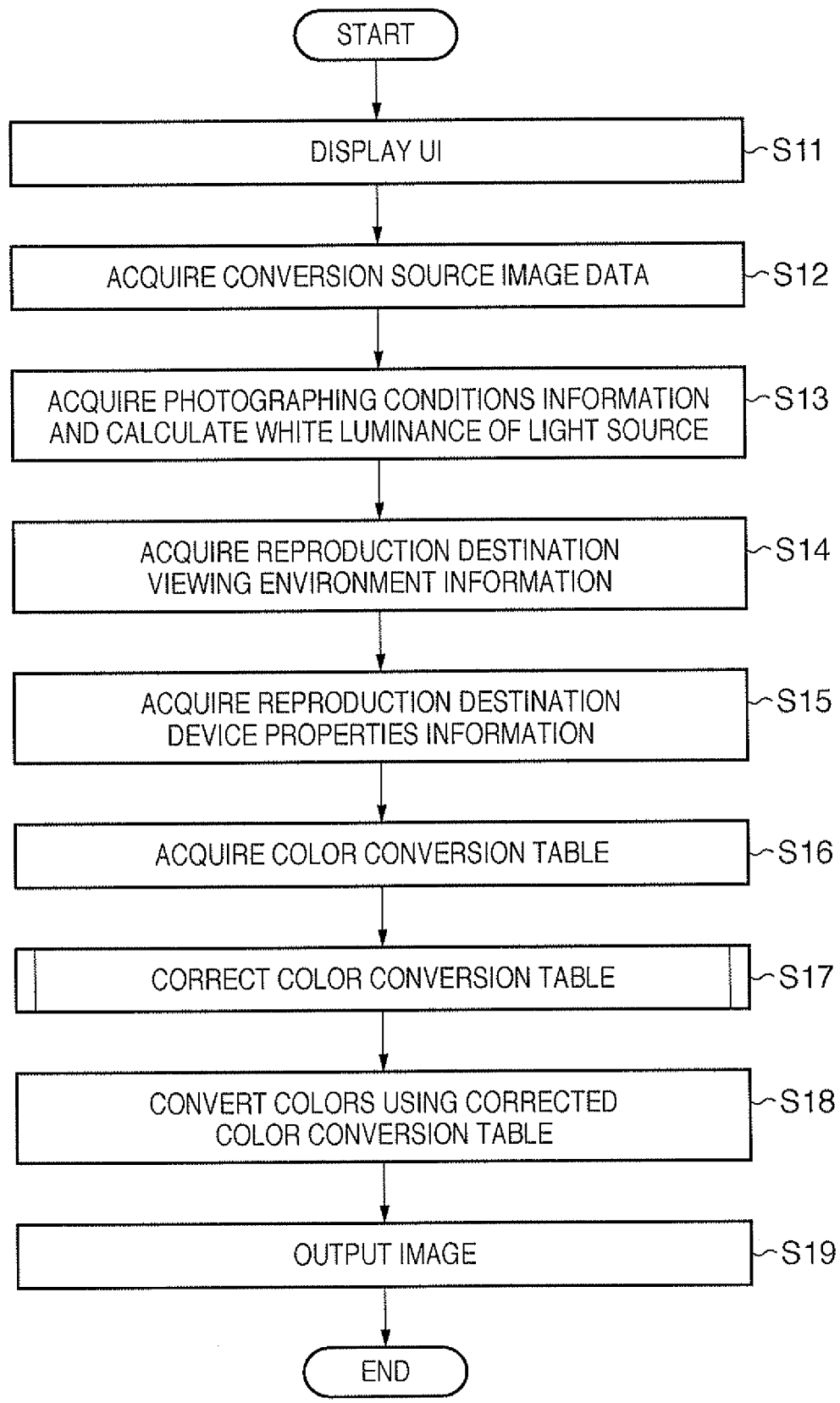
FIG. 8 is a flowchart illustrating an outline of color processing according to the second embodiment of the present invention.

Hereunder, an overview of color processing in the color processing apparatus 201 of the second embodiment is described using the flowchart shown in FIG. 8.

Figure 9:
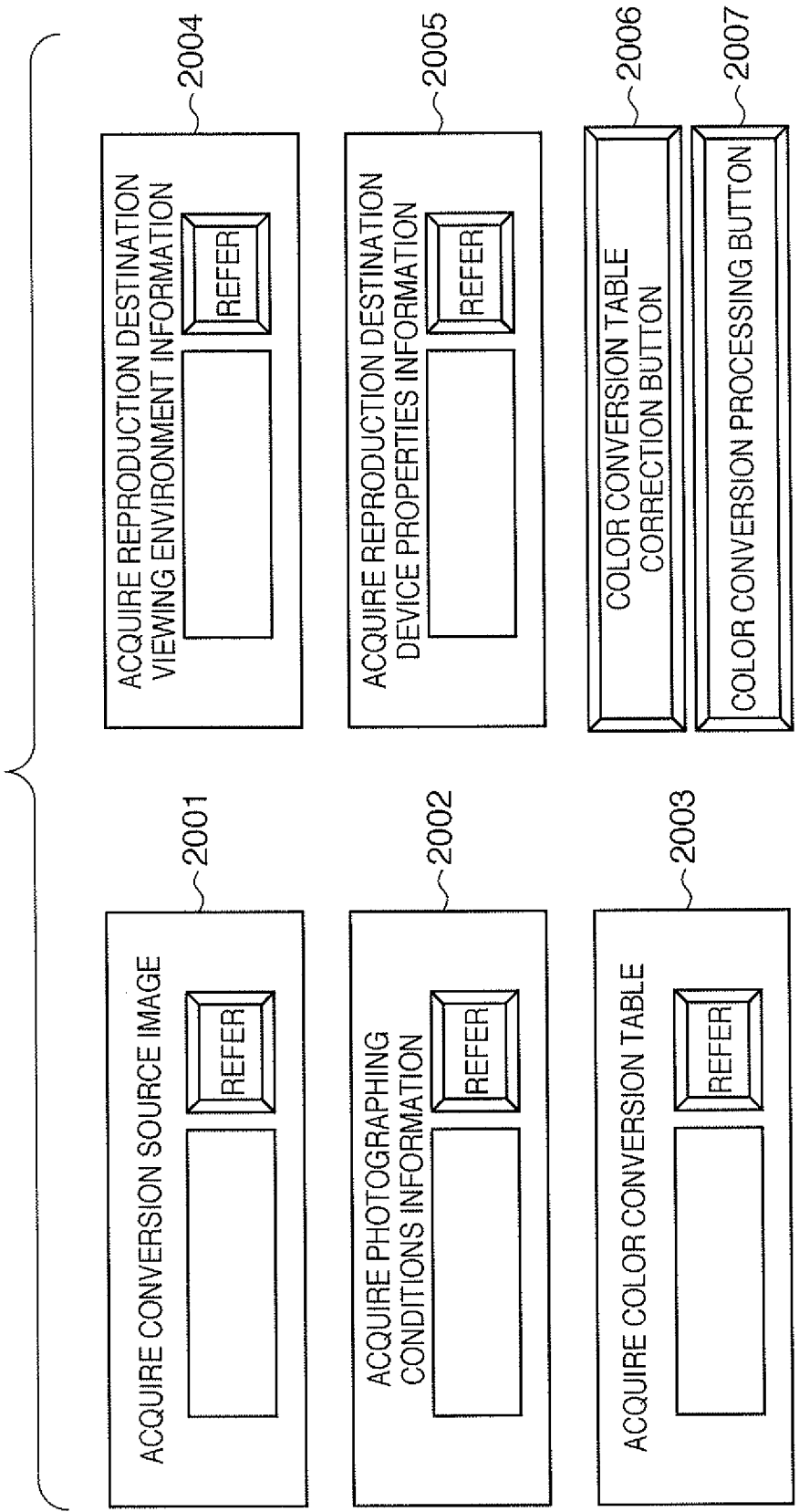
FIG. 9 is a view showing a UI example according to the second embodiment of the present invention.

First, in step S11, the UI unit 202 displays a user interface (UI) for allowing the user to input information necessary for color conversion. An example of the UI that is displayed by the UI unit 202 is shown in FIG. 9. The UI example shown in FIG. 9 includes a conversion source image acquisition UI portion 2001 that acquires an RGB image as a conversion source image, and a photographing conditions acquisition UI portion 2002 that acquires the photographing conditions at the time the subject was photographed. Further, the UI example shown in FIG. 9 includes a color conversion table acquisition UI portion 2003 that acquires a color conversion table that is designed with colors in a target environment that is previously assumed by the user, and a reproduction destination viewing environment information acquisition UI portion 2004 that acquires viewing environment information regarding the reproduction destination. Furthermore, the UI example shown in FIG. 9 includes a reproduction destination device properties information acquisition UI portion 2005 that acquires information regarding the properties of the reproduction destination device, a color conversion table correction button 2006, and a color conversion processing button 2007.

After various information has been input to the UI unit 202 in step S11 as described above, in the subsequent step S12 the image acquisition unit 203 refers to the image file name that has been input at the conversion source image acquisition UI portion 2001 from the buffer memory 211 to acquire the conversion source image data.

Next, in step S13, from the file that is input at the photographing conditions acquisition UI portion 2002, the photographing conditions acquisition unit 204 acquires information regarding the photographing conditions when the subject was photographed, and calculates the white luminance of the light source at the time of photographing and stores the result in the buffer memory 211. In this connection, camera settings such as the ISO sensitivity, lens aperture value, exposure time, and color space when the image was photographed are described in a file that is set by the photographing conditions acquisition UI portion 2002. The specific processing of the photographing conditions acquisition unit 204 is the same as that in the above described first embodiment, and hence a description thereof is omitted here.

In step S14, the reproduction destination viewing environment acquisition unit 205 acquires reproduction destination viewing environment information from the file input at the reproduction destination viewing environment information acquisition UI portion 2004, and stores the acquired information in the buffer memory 211. In this connection, the file that is input at the reproduction destination viewing environment information acquisition UI portion 2004 is in the format exemplified in FIG. 13, similarly to the first embodiment described above.

In step S15, the reproduction destination device properties acquisition unit 206 acquires the properties of the reproduction destination device from the file input at the reproduction destination device properties information acquisition UI portion 2005, and stores the acquired properties in the buffer memory 211. In this connection, the file that is input at the reproduction destination device properties information acquisition UI portion 2005 is in the same LUT format as in the first embodiment described above.

In step S16, the color conversion table acquisition unit 208 acquires a color conversion table described by color conversion information from the file input at the color conversion table acquisition UI portion 2003. The format of the color conversion table in the present embodiment is exemplified in FIG. 15. As shown in FIG. 15, the color conversion table describes viewing environment parameters that take into account the brightness of a scene of a reference environment that is taken as a target when creating the table in question. The color conversion table also describes data (correlation between input colors and output colors) for converting device RGB values into R'G'B' values in which favorable picture creation under the target environment is reflected.

Next, in step S17, the color conversion table correction unit 209 corrects the color conversion table acquired in step S16 in accordance with the photographing conditions acquired in step S13. The specific processing at the color conversion table correction unit 209 is described later.

In step S18, the color conversion processing unit 210 performs color conversion with respect to the RGB image that is acquired in step S12, using the corrected color conversion table that is created in step S17. Finally, in step S19, the output unit 207 outputs the RGB image data that has undergone color conversion, and ends the processing.

Color Conversion Table Correction Process (S17)

Figure 10:
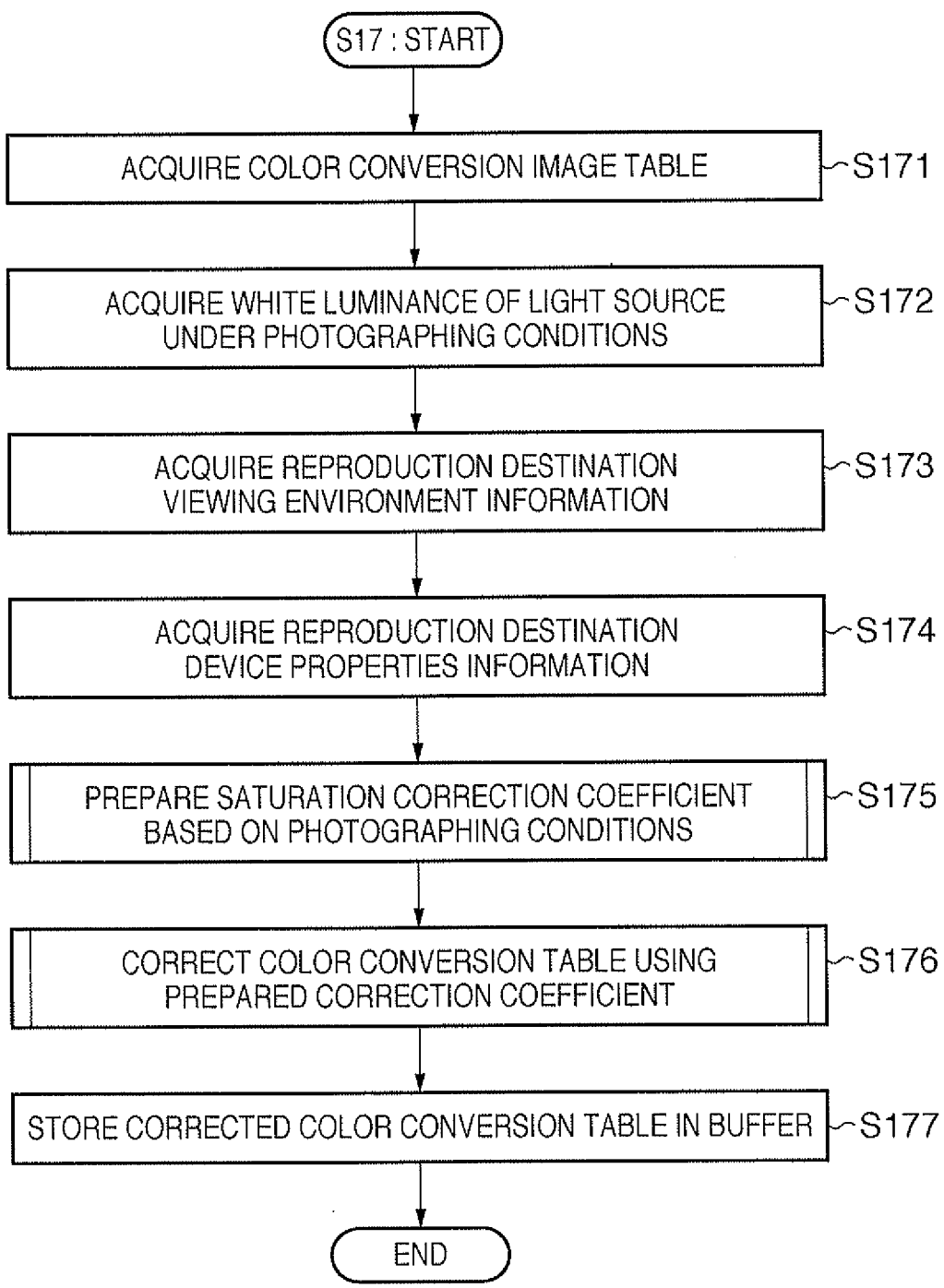
FIG. 10 is a flowchart illustrating a color conversion table correction processing according to the second embodiment of the present invention.

The specific operations of the color conversion table correction unit 209 in the aforementioned step S17 are described hereunder using the flowchart shown in FIG. 10.

First, in step S171, a color conversion table having the format shown in FIG. 15 is acquired from the buffer memory 211. In step S172, the white luminance of the light source under the conditions in which the subject has been photographed is acquired from the buffer memory 211. In step S173, information regarding the reproduction destination viewing environment is acquired from the buffer memory 211. In step S174, information regarding the reproduction destination device properties is acquired from the buffer memory 211.

Next, in step S175, a saturation correction coefficient is prepared based on the white luminance of the light source under the photographing conditions acquired in step S172. The method of preparing the saturation correction coefficient is described in detail later.

In step S176, the color conversion table is corrected using the saturation correction coefficient that is prepared in step S175. The method of correcting the color conversion table is described in detail later.

In step S177, the color conversion table corrected in step S176 is stored in the buffer memory 211.

Method of Preparing Saturation Correction Coefficient (S175)

Figure 11:
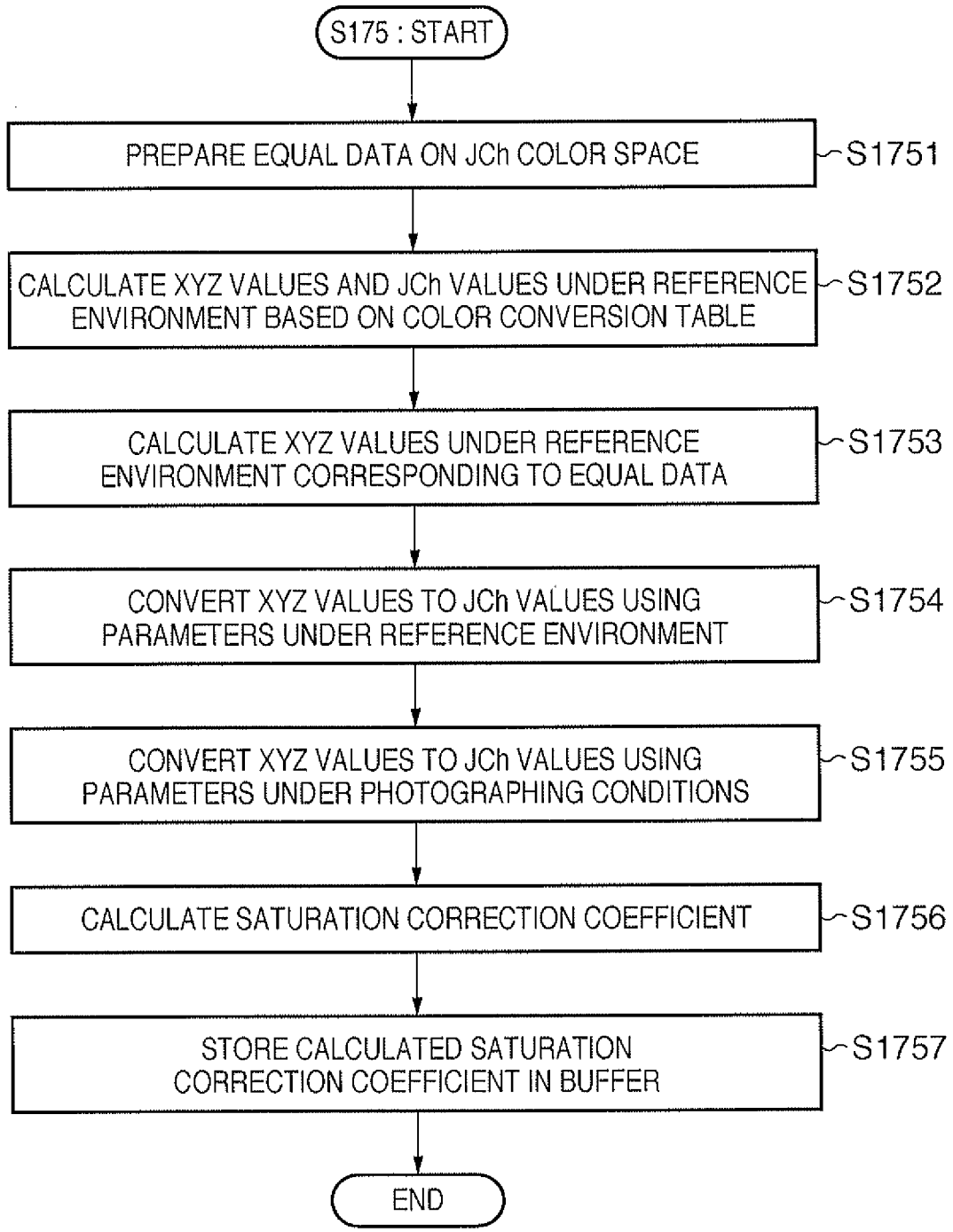
FIG. 11 is a flowchart illustrating a process to calculate a saturation correction coefficient according to the second embodiment of the present invention.

Hereunder, a method of preparing a saturation correction coefficient in the above-described step S175 is described using the flowchart shown in FIG. 11.

First, in step S1751, equal data on the JCh color space in CIECAM02 is prepared. According to the second embodiment, concentric data with three kinds of brightness (J=25, 50, 75), saturation C=12, and 15° gradations of hue is used as the equal data.

Next, in step S1752, XYZ values and JCh values under the reference environment are calculated based on the viewing environment parameters under the reference environment that are described in the color conversion table acquired in step S171, and the information regarding reproduction destination device properties acquired in step S174.

In step S1753, RGB values corresponding to the equal data prepared in step S1751 are calculated based on the correlation between the R'G'B' data of the color conversion table and the JCh values under the reference environment that are calculated in step S1752. This calculation is performed by interpolation arithmetic such as tetrahedral interpolation. Further, XYZ values for the thus-calculated RGB values are calculated based on information regarding the properties of the reproduction destination device that are acquired in step S174.

In step S1754, the XYZ values calculated in step S1753 are converted into JCh values using parameters under the reference environment that is described in the color conversion table acquired in step S171. In step S1755, the XYZ values calculated in step S1753 are converted into JCh values using the parameters under the photographing conditions that are acquired in step S172.

In step S1756, the saturation correction coefficient k (k=C'/C) is calculated based on the saturation C under the reference environment that is calculated in step S1754 and a saturation C' that is calculated under the photographing conditions calculated in step S1755. In this connection, a saturation correction coefficient is calculated for each brightness (J=25, 50, 75), and a saturation value when calculating a saturation correction coefficient is calculated based on the mean value of 24 kinds of hue.

In step S1757, the saturation correction coefficients that are calculated in step S1756 are stored in the buffer memory 211.

Method of Correcting Color Conversion Table (S176)

Figure 12:
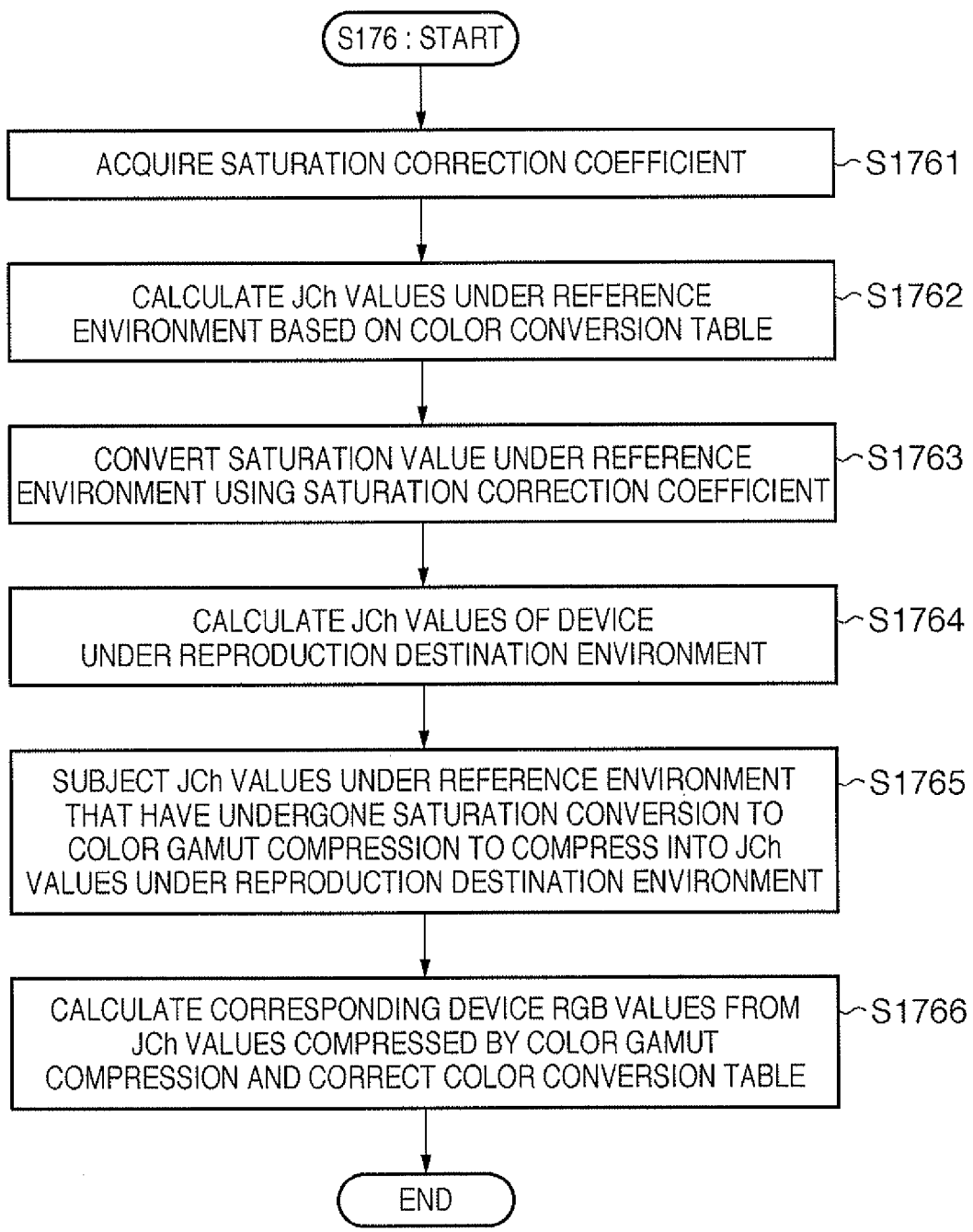
FIG. 12 is a flowchart illustrating a saturation correction process according to the second embodiment of the present invention.

Hereunder, a method of correcting the color conversion table in the above-described step S176 is described using the flowchart shown in FIG. 12.

First, in step S1761, a saturation correction coefficient k prepared in step S175 is acquired from the buffer memory 211.

Next, in step S1762, JCh values under the reference environment are calculated based on the color conversion table acquired in step S171 and information regarding reproduction destination device properties acquired in step S174.

In step S1763, the saturation C under the reference environment that is calculated in step S1762 is converted to a saturation C_a (C_a=k*C) using the saturation correction coefficient k acquired in step S1761. In this connection, saturation correction coefficients other than for brightness J=25, 50 or 75 are calculated by linear interpolation in accordance with the input brightness.

In step S1764, JCh values for the device under the reproduction destination environment are calculated based on the color conversion table acquired in step S171, information regarding the reproduction destination viewing environment acquired in step S173, and information regarding reproduction destination device properties acquired in step S174.

In step S1765, JCh values under the reference environment for which saturation has been corrected in step S1763 are compressed by color gamut compression into JCh values under the reproduction destination environment calculated in step S1764.

Next, in step S1766, the JCh values compressed by color gamut compression in step S1765 are used to calculate corresponding device RGB values. This calculation is performed using interpolation arithmetic such as tetrahedral interpolation based on the correlation between RGB values and JCh values under the reproduction destination environment. By storing the calculated device RGB values in the buffer memory 211 as R'G'B' data of the color conversion table after correction, correction of the color conversion table in the second embodiment is completed.

According to the second embodiment as described above, by executing saturation correction in accordance with photographing conditions on a color conversion LUT that obtains favorable color reproduction under a previously assumed target environment, it is possible to create an LUT that realizes favorable color reproduction in accordance with the scene of a subject at the time of photographing.

Modification Example

Hereunder, a modification example of the above described first and second embodiments is described.

Method of Acquiring Photographing Conditions Information

According to the above described first and second embodiments, as a method of acquiring photographing conditions, an example is described in which the white luminance of a light source is estimated by referring to an aperture value, ISO sensitivity, and exposure time from additional data (Exif data) of photographed image data. However, the present invention is not limited to this example, and any method may be used as long as it is possible to acquire the photographing conditions at the time of photographing. For example, a method may be employed in which the white luminance of the light source at the time of photographing is measured with a measuring device such as a spectral radiance meter or an illuminance meter, and the measurement value is then associated with the image file.

Method of Calculating Luminance Value of Image Data

According to the above described first embodiment, as a method of calculating the luminance value of image data, an example is described in which the luminance value Y is calculated using equation (3) based on the white luminance of the light source at the time of photographing and the RGB values of the input image data. However, the present invention is not limited to this example, and in a case in which the properties of the input device in the input profile acquired at the input device properties acquisition unit 108 are known, a luminance value corresponding to the RGB values of the input image data may be calculated from the input profile.

Method of Calculating Luminance Value of Adapting Field and Relative Luminance Value of Background Further, according to the above described first embodiment, an example is described in which, when calculating the luminance value of the adapting field and the relative luminance value of the background, a luminance histogram of the input image is prepared, the histogram is divided into three regions, and the mean luminance values in the three regions are calculated. However, the present invention is not limited to this example, and the number of regions into which a histogram may be divided is not limited to three. Further, although an example is described above that utilizes the mean luminance value in each region of the histogram, the mode or the like inside each region may be utilized. Furthermore, a method may be adopted in which a luminance value is calculated based on the RGB values of the input image data without preparing a histogram, and the luminance value is used as the luminance value of the adapting field and the relative luminance value of the background for each pixel of the input image data.

Method of Preparing Saturation Correction Coefficient

Although an example is described in the above second embodiment in which equal data on the JCh color space is prepared when preparing saturation correction coefficients, the format of equal data in the present invention is not limited thereto. For example, concentric data for other brightnesses, respectively, may be used with respect to values or number of data or the like. Furthermore, although the second embodiment describes an example in which, correction coefficients for brightness J=25, 50, and 75 are calculated as saturation correction coefficients, and a saturation correction coefficient for another brightness is calculated by linear interpolation based on the correlation with the correction coefficients, the number of brightness settings and the interpolation format according to the present invention is not limited thereto.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-029585, filed Feb. 8, 2008, which is hereby incorporated by reference herein in its entirety.

What is claimed is:

1. A color processing apparatus, comprising:
a white setting unit configured to set a white value of viewing conditions;
a calculation unit configured to calculate a luminance histogram of image data;
an adapting field setting unit configured to set a luminance value of an adapting field for each of a plurality of luminance ranges based on representative values calculated from a distribution of a plurality of luminance ranges of the calculated luminance histogram, wherein each luminance range is divided according to luminances of pixels of color data;
a selection unit configured to select a luminance value of an adapting field in accordance with a luminance value of the color data which is also a color conversion object based on the luminance value of the adapting field set for each of the plurality of luminance ranges; and
a color conversion unit configured to carry out color conversion of the color data, using a color appearance model which models a degree of adaptation with respect to an illuminating light, using the white value set by said white setting unit and the luminance value selected by said selection unit.

2. The color processing apparatus according to claim 1, wherein the luminance value is a luminance value of an adapting field and a relative luminance value of a background defined in CIECAM02.

3. The color processing apparatus according to claim 2, wherein the relative luminance value of the background is standardized.

4. The color processing apparatus according to claim 1, wherein the adapting field setting unit is configured to set the luminance value of an adapting field and a relative luminance value of a background.

5. A method of preparing a look-up table for performing color conversion, comprising the steps of:
setting a white value of viewing conditions;
calculating a luminance histogram of image data;
setting a luminance value of an adapting field for each of a plurality of luminance ranges based on representative values calculated from a distribution of a plurality of luminance ranges of the calculated luminance histogram, wherein each luminance range is divided according to luminances of pixels of color data;
selecting a luminance value of an adapting field in accordance with a luminance value of the color data which is also a color conversion object based on the luminance value of the adapting field set for each of the plurality of luminance ranges; and
preparing a look-up table for performing color conversion of the color data, using a color appearance model which models a degree of adaptation with respect to an illuminating light, using the white value set and the luminance value selected.

6. A non-transitory computer-readable storage medium having stored thereon a computer-executable program, the program, when loaded in a computer, causing the computer to:
set a white value of viewing conditions;
calculate a luminance histogram of image data;
set a luminance value of an adapting field for each of a plurality of luminance ranges based on representative values calculated from a distribution of a plurality of luminance ranges of the calculated luminance histogram, wherein each luminance range is divided according to luminances of pixels of color data;
select a luminance value of an adapting field in accordance with a luminance value of the color data which is also a color conversion object based on the luminance value of the adapting field set for each of the plurality of luminance ranges; and
prepare a look-up table for performing color conversion of the color data, using a color appearance model which models a degree of adaptation with respect to an illuminating light, using the white value set and the luminance value selected.

* * * * *